(12) United States Patent
Liu et al.

(10) Patent No.: US 12,402,092 B2
(45) Date of Patent: Aug. 26, 2025

(54) TIME CALIBRATION METHOD, COMMUNICATION DEVICE, AND COMPUTER-READABLE MEDIUM

(71) Applicant: ZTE CORPORATION, Guangdong (CN)

(72) Inventors: Feng Liu, Guangdong (CN); Li He, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 245 days.

(21) Appl. No.: 18/033,830

(22) PCT Filed: Oct. 18, 2021

(86) PCT No.: PCT/CN2021/124333
§ 371 (c)(1),
(2) Date: Apr. 26, 2023

(87) PCT Pub. No.: WO2022/089231
PCT Pub. Date: May 5, 2022

(65) Prior Publication Data
US 2023/0403665 A1    Dec. 14, 2023

(30) Foreign Application Priority Data
Oct. 27, 2020    (CN) .......................... 202011165572.7

(51) Int. Cl.
*H04W 56/00*    (2009.01)
*H04J 3/06*    (2006.01)

(52) U.S. Cl.
CPC ......... *H04W 56/004* (2013.01); *H04J 3/0667* (2013.01)

(58) Field of Classification Search
CPC ........................... H04W 56/004; H04J 3/0667
See application file for complete search history.

(56) References Cited

U.S. PATENT DOCUMENTS

| | | | |
|---|---|---|---|
| 5,802,082 A | 9/1998 | Roppel | |
| 6,545,979 B1 | 4/2003 | Poulin | |

(Continued)

FOREIGN PATENT DOCUMENTS

| | | |
|---|---|---|
| CN | 103973592 A | 8/2014 |
| CN | 109392074 A | 2/2019 |

(Continued)

OTHER PUBLICATIONS

Korean Patent Office, the first Office action dated Oct. 22, 2024, for corresponding KR application No. 10-2023-7016750.

(Continued)

*Primary Examiner* — Bailor C Hsu
(74) *Attorney, Agent, or Firm* — Li & Cai Intellectual Property (USA) Office

(57) ABSTRACT

The present disclosure provides a time calibration method, including: determining, in response to a first cell transmitted from a first device, a first reception time corresponding to the first cell, and transmitting a second cell to the first device; and receiving a third cell that is fed back by the first device and carries a second reception time corresponding to the second cell, determining a first time offset value according to a first transmission time, the first reception time, a second transmission time corresponding to the second cell and the second reception time, and performing a time calibration according to the first time offset value. The present disclosure further provides a communication device and a computer-readable medium.

17 Claims, 5 Drawing Sheets

Determine, in response to a first cell transmitted from a first device, a first reception time corresponding to the first cell, and transmit a second cell to the first device — S1

Receive a third cell fed back by the first device and carrying a second reception time corresponding to the second cell, determine a first time offset value according to a first transmission time, the first reception time, a second transmission time corresponding to the second cell and the second reception time, and perform a time calibration according to the first time offset value — S2

(56) References Cited

U.S. PATENT DOCUMENTS

| | | | |
|---|---|---|---|
| 9,060,342 B2* | 6/2015 | Wu | G01S 5/10 |
| 9,094,286 B2* | 7/2015 | Miyabe | H04L 45/02 |
| 9,602,271 B2* | 3/2017 | Benjamini | H04L 7/0012 |
| 9,614,819 B2* | 4/2017 | Mizrahi | H04J 3/0667 |
| 10,855,388 B2* | 12/2020 | Joseph | H04J 3/0673 |
| 2010/0189206 A1 | 7/2010 | Kagan | |
| 2011/0051754 A1 | 3/2011 | Lansdowne | |
| 2012/0207183 A1* | 8/2012 | Bobrek | H04J 3/0641 370/511 |
| 2013/0145041 A1 | 6/2013 | Ruffini et al. | |
| 2013/0170507 A1 | 7/2013 | Hsueh et al. | |
| 2013/0315606 A1* | 11/2013 | Lanzone | H04J 3/065 398/154 |
| 2014/0068315 A1* | 3/2014 | Aweya | G06F 1/14 713/503 |
| 2014/0079409 A1* | 3/2014 | Ruffini | H04L 43/0858 398/154 |
| 2015/0071309 A1* | 3/2015 | Aweya | H04J 3/0664 370/503 |
| 2015/0334056 A1 | 11/2015 | Lam | |
| 2015/0358700 A1 | 12/2015 | Lee et al. | |
| 2016/0170439 A1* | 6/2016 | Aweya | H04L 69/28 713/401 |
| 2019/0045259 A1* | 2/2019 | Beardsley | H04L 65/611 |
| 2019/0097745 A1 | 3/2019 | Mallela et al. | |

FOREIGN PATENT DOCUMENTS

| | | |
|---|---|---|
| EP | 3054609 B1 | 1/2019 |
| EP | 3664375 A1 | 6/2020 |
| KR | 20180064369 A | 6/2018 |
| WO | WO2015089848 A1 | 6/2015 |
| WO | WO2017057040 A1 | 4/2017 |

OTHER PUBLICATIONS

WIPO, International Search Report issued on Jan. 5, 2022.

Japan Patent Office, first Office action dated May 28, 2024, for corresponding JP application No. 2023-524974.

European Patent Office, the Extended European Search Report dated Sep. 3, 2024, for corresponding EP application No. 21884959.4.

* cited by examiner

TIME CALIBRATION METHOD, COMMUNICATION DEVICE, AND COMPUTER-READABLE MEDIUM

CROSS-REFERENCE TO RELATED APPLICATIONS

This application claims the priority of Chinese patent application No. 202011165572.7 filed on Oct. 27, 2020, the entirety of which is incorporated hereby by reference.

TECHNICAL FIELD

The present disclosure relates to the field of communication technology, and in particular relates to a time calibration method, a communication device, and a computer-readable medium.

BACKGROUND

Currently, a bandwidth for information transmission of a communication network is rapidly increased, and an interface bandwidth of a communication device has reached 100 Gbps. However, for providing corresponding support for high-bandwidth services, the network is still desired to transmit low-speed private line services, such as power, banks, railways and the like, which typically expect a bandwidth much smaller than an interface bandwidth of a network interface of a device, but has relatively high expectations on the quality of service of bandwidth services, therefore should be strictly ensured to utilize an exclusive bandwidth physically isolated from that for other services. In view of above, a communication over the network is usually implemented in a cell mode, in which each corresponding service is carried on a plurality of cells, and a smaller number of cells are used in response to that the bandwidth expected is relatively low, so that various client expectations for different speeds are met. Accordingly, time synchronization is a basic expectation of the communication network, and time synchronization between Ethernet devices in the communication performed in the cell mode has become a subject currently researched.

SUMMARY

In a first aspect, the present disclosure provides a time calibration method, including: determining, in response to a first cell transmitted from a first device, a first reception time corresponding to the first cell, and transmitting a second cell to the first device, the first cell carrying a first transmission time corresponding to the first cell; and receiving a third cell that is fed back by the first device and carries a second reception time corresponding to the second cell, determining a first time offset value according to the first transmission time, the first reception time, a second transmission time corresponding to the second cell, and the second reception time, and performing a time calibration according to the first time offset value.

In a second aspect, the present disclosure further provides a time calibration method, including: determining a first transmission time corresponding to a first cell, placing the first transmission time in the first cell, and transmitting the first cell to a second device; and determining, in response to a second cell transmitted from the second device, a second reception time corresponding to the second cell, placing the second reception time in the third cell, and feeding the third cell back to the second device, so that the second device determines a first time offset value according to the first transmission time, a first reception time corresponding to the first cell, a second transmission time of the second cell, and the second reception time, and performs a time calibration according to the first time offset value.

In a third aspect, the present disclosure further provides a communication device, including: at least one processor; and a storage means having at least one program stored thereon, the at least one program, executed by the at least one processor, causes the at least one processor to perform the time calibration method including transmitting the second cell to the first device as described above.

In a fourth aspect, the present disclosure further provides a communication device, including: at least one processor; and a storage means having at least one program stored thereon, the at least one program, executed by the at least one processor, causes the at least one processor to perform the time calibration method including transmitting the first cell to the second device as described above.

In a fifth aspect, the present disclosure further provides a computer-readable medium storing a computer program thereon, the computer program, executed by a processor, causes the processor to perform operations of the time calibration method including transmitting the second cell to the first device as described above, and/or operations of the time calibration method including transmitting the first cell to the second device as described above.

DETAIL DESCRIPTION OF EMBODIMENTS

In order to make those skilled in the art better understand technical solutions of the present disclosure, the following describes the time calibration method, the communication device, and the computer-readable medium of the present disclosure in detail with reference to the accompanying drawings.

Example embodiments will be described more sufficiently below with reference to the accompanying drawings, but may be embodied in different forms and should not be construed as limited to the embodiments set forth herein. These embodiments are provided so that the present disclosure will be more thorough and complete, and will fully convey the scope of the present disclosure to those skilled in the art.

The terminology used herein is for the purpose of describing specific embodiments only and is not intended to limit the present disclosure. As used herein, the singular forms "a", "an" and "the" are intended to include the plural forms as well, unless the context clearly indicates otherwise. It will be further understood that as used herein, the terms "comprise/include" and/or "consist of/made of" specify the presence of specific features, integers, steps, operations, elements, and/or components, but do not preclude the presence or addition of one or more other features, entities, steps, operations, elements, components, and/or groups thereof.

It will be understood that, although the terms "first", "second", etc. may be used herein to describe various elements, these elements should not be limited by these terms. These terms are merely used to distinguish one element from another. Thus, a first element, component, or module discussed below could be termed a second element, component, or module without departing from the teachings of the present disclosure.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the existing art and the present disclosure, and will not be interpreted in an idealized or overly formal sense unless expressly so defined herein.

The time calibration method, the communication device and the computer-readable medium of the present disclosure can be used for transferring corresponding time information through cells, determining a transmission time and a reception time corresponding to each cell, and calculating a time offset value to perform a time calibration, so as to implement time synchronization in a communication performed in a cell mode.

Figure 1:
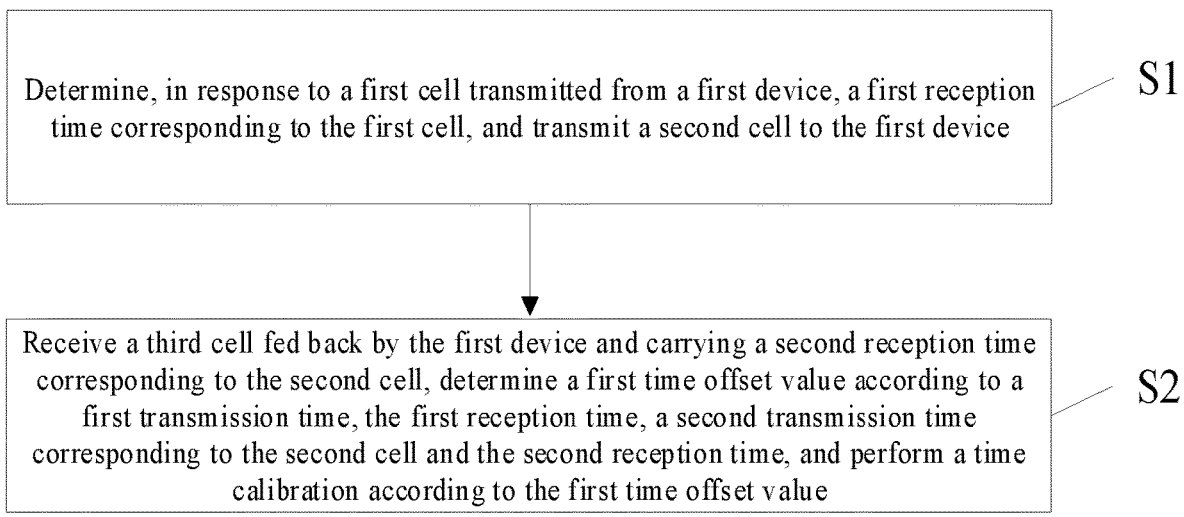
FIG. 1 is a flowchart of a time calibration method according to the present disclosure.

FIG. 1 is a flowchart of a time calibration method according to the present disclosure. As shown in FIG. 1, the time calibration method is applied to a second device, and includes operations S1 and S2.

At operation S1, determining, in response to a first cell transmitted from a first device, a first reception time corresponding to the first cell, and transmitting a second cell to the first device.

The first cell carries a first transmission time corresponding to the first cell.

Specifically, a reception time of a cell is obtained from a clock of a device that receives the cell, that is, indicates a corresponding time at which the device receives the cell, and a transmission time of a cell is obtained from a clock of a device that transmits the cell, that is, indicates a corresponding time at which the device transmits the cell. In operation S1, generally, the first reception time corresponding to the first cell is the reception time of the first cell, which may be directly measured, or determined by calculating from a reception time of another cell and a number of related code blocks. In some implementations, the first reception time corresponding to the first cell may also be determined from related time parameters of a cell multi-frame to which the first cell belongs.

At operation S2, receiving a third cell that is fed back by the first device and carries a second reception time corresponding to the second cell, determining a first time offset value according to a first transmission time, the first reception time, a second transmission time corresponding to the second cell and the second reception time, and performing a time calibration according to the first time offset value.

Accordingly, in operation S2, the second transmission time corresponding to the second cell is generally the transmission time of the second cell, which may be directly measured, or determined by calculating from a transmission time of another cell and a number of related code blocks. In some implementations, the second transmission time corresponding to the second cell may also be determined from related time parameters of a cell multi-frame to which the second cell belongs.

In some implementations, the operation of determining the first time offset value Offset according to the first transmission time T1, the first reception time T2, the second transmission time T3 and the second reception time T4 is, specifically, based on formulas:

T2=T1+Delay+Offset; and T4=T3+Delay-Offset; and a delay value Delay and a time offset value Offset are solved.

It should be noted that the above description of calculation of the time offset value is merely one of implementations of the present disclosure, and does not limit the technical solution of the present disclosure, and other calculation methods and parameter determination processes are also applicable to the technical solution of the present disclosure.

In some implementations, the first device may be referred to as a master device or a reference device, the second device may be referred to as a slave device, and the first device as a reference clock source performs the time calibration to achieve time synchronization between such two devices.

The time calibration method according to the present disclosure can be used for receiving and determining, in a communication performed in a cell mode, a first transmission time and a first reception time corresponding to a first cell, feeding back a second cell and determining a second reception time and a second transmission time corresponding to the second cell, determining, according to such two sets of transmission times and reception times, a first time offset value and performing a time calibration, so as to achieve time synchronization between a current device and the reference device.

In some implementations, the first cell, the second cell, and the third cell carry at least some message data of precision time protocol messages corresponding to the first cell, the second cell, and the third cell, respectively; and the precision time protocol messages include a synchronize (Sync) message, a delay request (Delay_Req) message, and a delay response (Delay_Resp) message.

Specifically, during the precision time protocol being used for the time calibration, the first transmission time, the first reception time, the second transmission time and the second reception time are all embodied in time stamps, and the second device, by acquiring a time stamp in message data carried by a cell, parses and records a time stamp value to determine the corresponding transmission time or reception time.

During the communication between devices being performed in a message mode, each device directly transmits a precision time protocol message carrying a time stamp, so that a calculation of the time offset value and a subsequent time calibration can be completed by simply parsing the message and extracting the time stamp. However, during the communication between devices being performed in a cell mode, the precision time protocol message cannot be directly transmitted, so that the transmission time and the reception time corresponding to the precision time protocol message cannot be determined, and time synchronization based on the precision time protocol cannot be implemented. In the present disclosure, at least part message data of precision time protocol messages corresponding to cells is carried by the respective cells, so as to implement the time calibration and the time synchronization based on the precision time protocol.

Figure 2:
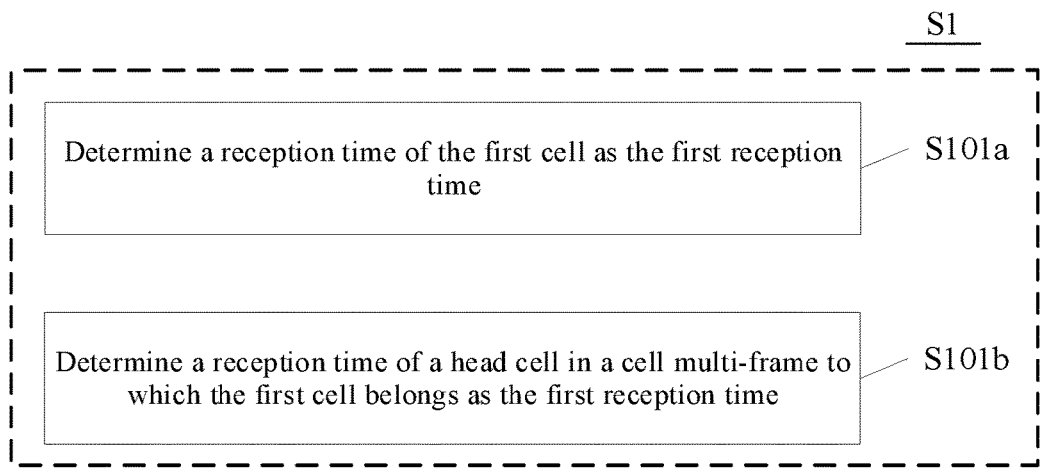
FIG. 2 is a flowchart of a method for implementing operation S1 according to the present disclosure.

FIG. 2 is a flowchart of a method for implementing operation S1 according to the present disclosure. Specifically, each single precision time protocol message corresponds to a plurality of message cells, all message data of each single precision time protocol message are transmitted over a general communication channel in an overhead area of the message cells. The first cell is a first one (i.e., head cell) of a plurality of first message cells corresponding to a time synchronization message. As shown in FIG. 2, in operation S1, determining the first reception time corresponding to the first cell includes: operation S101a.

At operation S101a, determining a reception time of the first cell as the first reception time.

In operation S101a, the reception time of the first cell is directly used as the first reception time, i.e., the reception time of the first one (i.e., head cell) of the plurality of first message cells corresponding to the time synchronization message is taken as the first reception time.

Specifically, the fact that each single precision time protocol message corresponds to a plurality of message cells means that message data of each single precision time protocol message is carried over the plurality of message cells, and the description of "message cell" is merely used to reflect the fact that the cell carries message data of the corresponding message. Since the overhead area of each cell can carry merely little information, and each single precision time protocol message has a length of at least 64 bytes, in some implementations, each precision time protocol message is desired to be carried over a plurality of cells.

Alternatively, in operation S1, determining the first reception time corresponding to the first cell includes: operation S101b.

At operation S101b, determining a reception time of a head cell (may also be called a first cell) in a cell multi-frame, to which the first cell belongs, as the first reception time.

In operation S101b, the reception time of the head cell in the cell multi-frame to which the first cell belongs is taken as the first reception time, i.e., the reception time of the head cell of a first cell multi-frame corresponding to the time synchronization message is taken as the first reception time. Specifically, the first cell is a first one (i.e., head cell) of a plurality of first message cells corresponding to the time synchronization message, and since there is a case where the first cell is not the head cell of the cell multi-frame to which the first cell belongs, the time information of the head cell of the cell multi-frame is used as a reference.

It should be noted that the "head" in the head cell corresponding to the message indicates that, among all cells corresponding to the message, a transmission order of the cell is ranked first, that is, the cell is first in chronological order.

Figure 3:
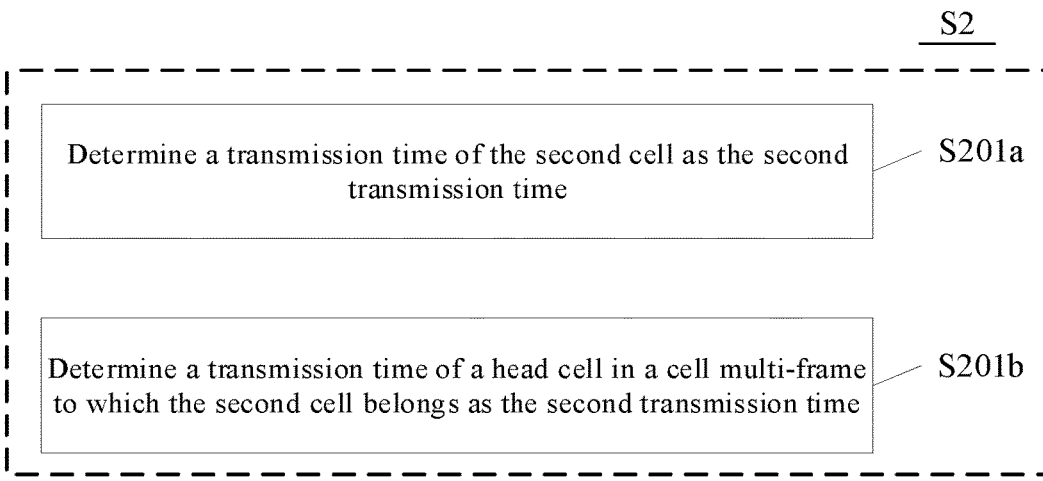
FIG. 3 is a flowchart of a method for implementing operation S2 according to the present disclosure.

FIG. 3 is a flowchart of a method for implementing operation S2 according to the present disclosure. Specifically, the second cell is a first one (i.e., head cell) of a plurality of second message cells corresponding to a delay request message. In operation S2, before determining the first time offset value according to the first transmission time, the first reception time, the second transmission time corresponding to the second cell, and the second reception time, and performing the time calibration according to the first time offset value, the method further includes: operation S201a.

At operation S201a, determining a transmission time of the second cell as the second transmission time.

In operation S201a, the transmission time of the second cell is directly used as the second transmission time, i.e., the transmission time of the first one (i.e., head cell) of the plurality of second message cells corresponding to the delay request message is taken as the second transmission time.

Alternatively, in operation S2, before determining the first time offset value according to the first transmission time, the first reception time, the second transmission time corresponding to the second cell, and the second reception time, and performing the time calibration according to the first time offset value, the method further includes: operation S201b.

At operation S201b, determining a transmission time of a head cell (may also be called a first cell) in a cell multi-frame, to which the second cell belongs, as the second transmission time.

In operation S201b, the transmission time of the head cell in the cell multi-frame to which the second cell belongs is taken as the second transmission time, i.e., the transmission time of the head cell of a first cell multi-frame corresponding to the delay request message is taken as the second transmission time.

The time calibration method according to the present disclosure can be used for embedding message data corresponding to a precision time protocol message in a cell during the communication being performed in a cell mode, so as to implement the time calibration and the time synchronization based on the cell mode and the precision time protocol.

Figure 4:
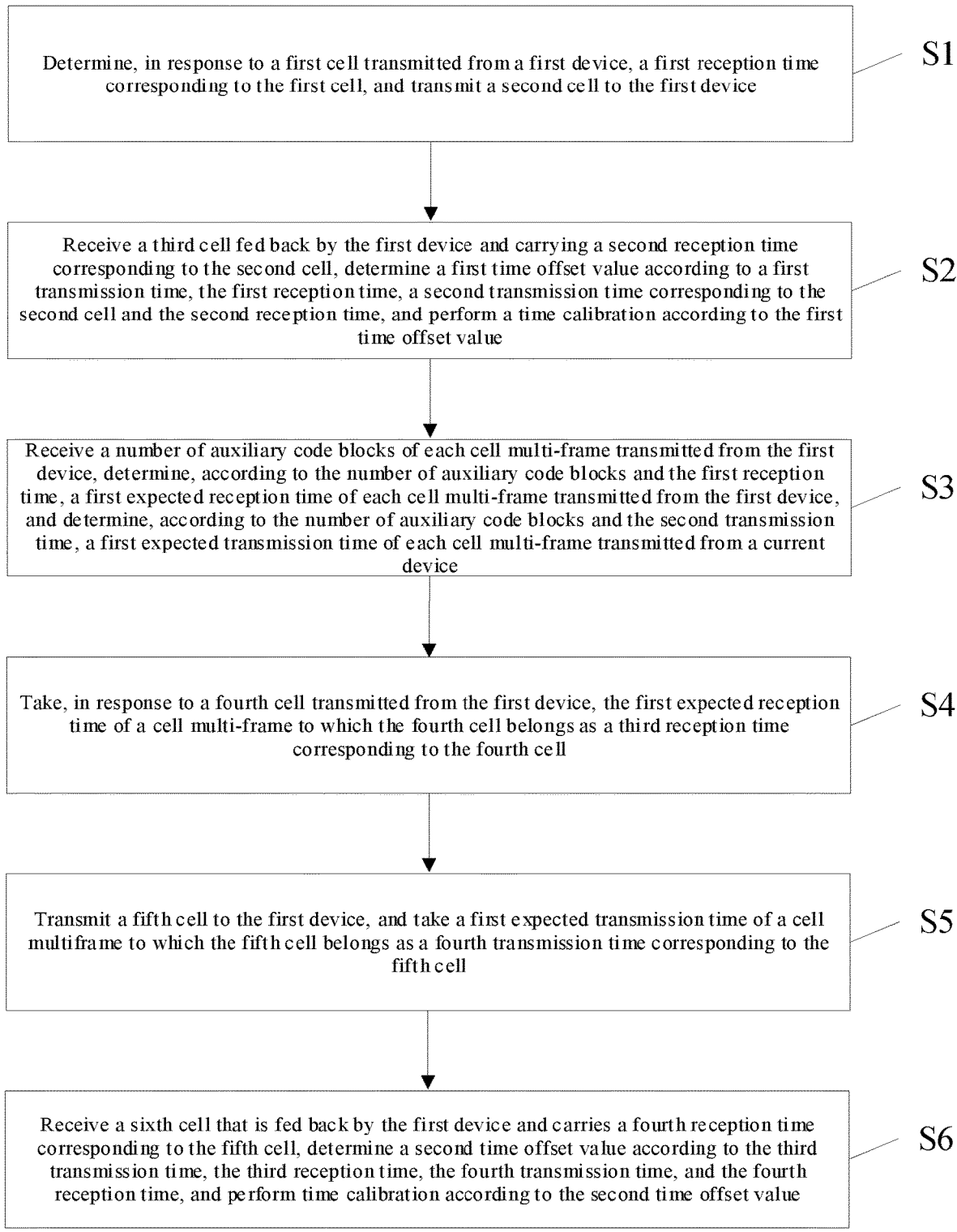
FIG. 4 is another flowchart of a time calibration method according to the present disclosure.

FIG. 4 is another flowchart of a time calibration method according to the present disclosure. As shown in FIG. 4, the time calibration method is a specific implementation based on the method shown in FIG. 1. Specifically, the first reception time is determined from the reception time of the head cell in the cell multi-frame to which the first cell belongs, and the second transmission time is determined from the transmission time of the head cell in the cell multi-frame to which the second cell belongs. In addition to operations S1 and S2, the time calibration method further includes: operations S3 to S6.

At operation S3, receiving a number of auxiliary code blocks of each cell multi-frame transmitted from the first device, determining, according to the number of auxiliary code blocks and the first reception time, a first expected reception time of each cell multi-frame transmitted from the first device, and determining, according to the number of auxiliary code blocks and the second transmission time, a first expected transmission time of each cell multi-frame transmitted from a current device.

In operation S3, a predicted time at which each cell multi-frame transmitted from the first device is received by the current device is determined according to the number of auxiliary code blocks and the first reception time, and a predicted time at which each cell multi-frame is transmitted from the current device is determined according to the number of auxiliary code blocks and the second transmission time. Therefore, the first expected reception (transmission) time of the cell multi-frame determined as above is an expected reception (transmission) time of the head cell in the cell multi-frame.

Specifically, the first expected reception time $T_{x+1}$ may be obtained based on the following formula: $T_{x+1} = T_x + (n*m+$ $y_x)*w*t$, where $T_x$ is a first reception time corresponding to a previous time calibration process, n is the number of cells in each cell multi-frame, m is the number of bit blocks in each cell, w is a size of each bit block, t is a transmission time duration corresponding to each bit block, and n, m and t may be set to fixed values; $y_x$ denotes the number of auxiliary code blocks, i.e., non-cell code blocks, including other code blocks besides S, D, and T blocks, such as O blocks and idle blocks. The first expected transmission time may be calculated in a similar manner.

It should be noted that, in the present disclosure, the execution sequence of operations S1, S2, and S3 is not limited, and operation S3 may be performed after operation S2, or performed in alternation with operation S2.

After the operation S2 of performing the time calibration according to the first time offset value, the time calibration method may further include operation S4.

At operation S4, taking, in response to a fourth cell transmitted from the first device, the first expected reception time of the cell multi-frame to which the fourth cell belongs as a third reception time corresponding to the fourth cell.

The fourth cell carries a third transmission time corresponding to the fourth cell.

Specifically, in a subsequent time calibration, the expected reception (transmission) time calculated may be used to directly derive the corresponding reception (transmission) time of the cell, and thus, no real-time detection process is desired.

In some implementations, each cell further carries a cell multi-frame ID of the cell multi-frame to which the cell belongs, so that the device can quickly know the cell multi-frame to which the cell belongs, and thereby search the corresponding expected reception (transmission) time. The cell multi-frame ID may include a cell multi-frame sequence number, a cell multi-frame label, and many other forms. Generally, cell multi-frames are transmitted according to sequence numbers corresponding thereto, and the sequence numbers are continuously repeated so that the cell multi-frames are transmitted circularly.

At operation S5, transmitting a fifth cell to the first device, and taking the first expected transmission time of the cell multi-frame to which the fifth cell belongs as a fourth transmission time corresponding to the fifth cell.

At operation S6, receiving a sixth cell that is fed back by the first device and carries a fourth reception time corresponding to the fifth cell, determining a second time offset value according to the third transmission time, the third reception time, the fourth transmission time, and the fourth reception time, and performing a time calibration according to the second time offset value.

The time calibration method according to the present disclosure can be used for calculating time information for a current time calibration based on the number of auxiliary code blocks and time information of a previous time calibration, so that no real-time detection process is desired, and an efficiency of calibration is increased.

Figure 5:
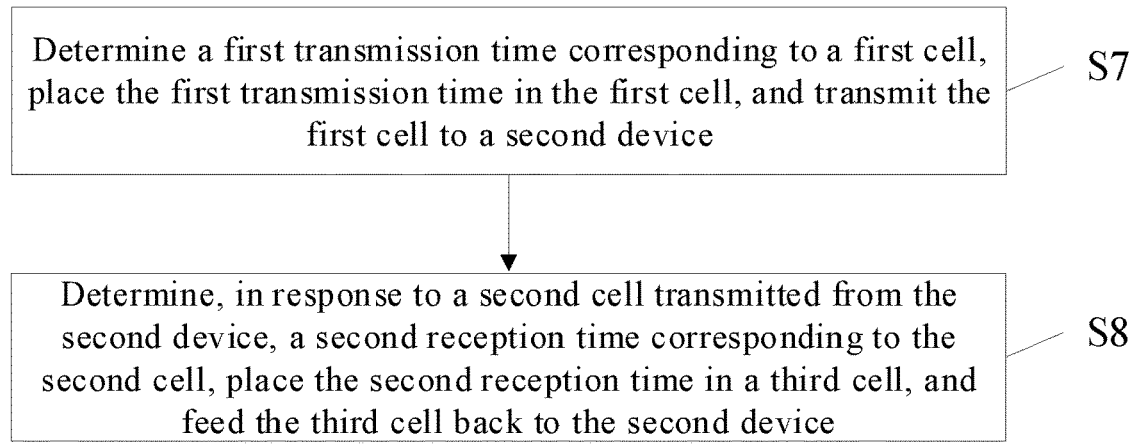
FIG. 5 is yet another flowchart of a time calibration method according to the present disclosure.

FIG. 5 is yet another flowchart of a time calibration method according to the present disclosure. As shown in FIG. 5, the time calibration method is applied to a first device, and includes operations S7 and S8.

At operation S7, determining a first transmission time corresponding to a first cell, placing the first transmission time in the first cell, and transmitting the first cell to a second device.

At operation S8, determining, in response to a second cell transmitted from the second device, a second reception time corresponding to the second cell, placing the second reception time in a third cell, and feeding the third cell back to the second device.

In operation S8, the third cell is fed back to the second device, so that the second device determines a first time offset value according to the first transmission time, a first reception time corresponding to the first cell, a second transmission time of the second cell, and the second reception time, and the time calibration is performed according to the first time offset value.

In some implementations, the first cell, the second cell, and the third cell carry at least some message data of precision time protocol messages corresponding to the first cell, the second cell, and the third cell, respectively; and the precision time protocol messages include a time synchronization message, a delay request message, and a delay response message.

Figure 6:
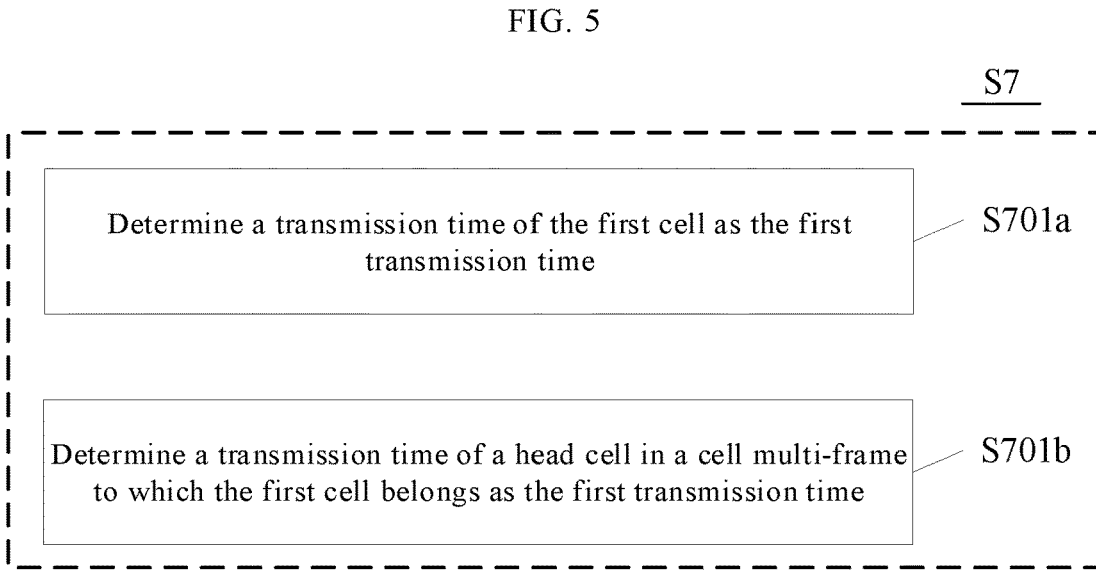
FIG. 6 is a flowchart of a method for implementing operation S7 according to the present disclosure.

FIG. 6 is a flowchart of a method for implementing operation S7 according to the present disclosure. Specifically, each single precision time protocol message corresponds to a plurality of message cells, all message data of each single precision time protocol message are transmitted over a general communication channel in an overhead area of the plurality of message cells. The first cell is a first one (i.e., head cell) of a plurality of first message cells corresponding to the time synchronization message. As shown in FIG. 6, in operation S7, determining the first transmission time corresponding to the first cell includes: operation S701a.

At operation S701a, determining a transmission time of the first cell as the first transmission time.

In operation S701a, the transmission time of the first cell (i.e., the time at which the first cell is transmitted) is directly used as the first transmission time, i.e., the transmission time of the head cell of the plurality of first message cells corresponding to the time synchronization message is taken as the first transmission time.

Alternatively, in operation S7, determining the first transmission time corresponding to the first cell includes: operation S701b.

At operation S701b, determining a transmission time of a head cell in a cell multi-frame to which the first cell belongs as the first transmission time.

In operation S701b, the transmission time of the head cell in the cell multi-frame to which the first cell belongs is taken as the first transmission time, i.e., the transmission time of the head cell of a first cell multi-frame corresponding to the time synchronization message is taken as the first transmission time.

Figure 7:
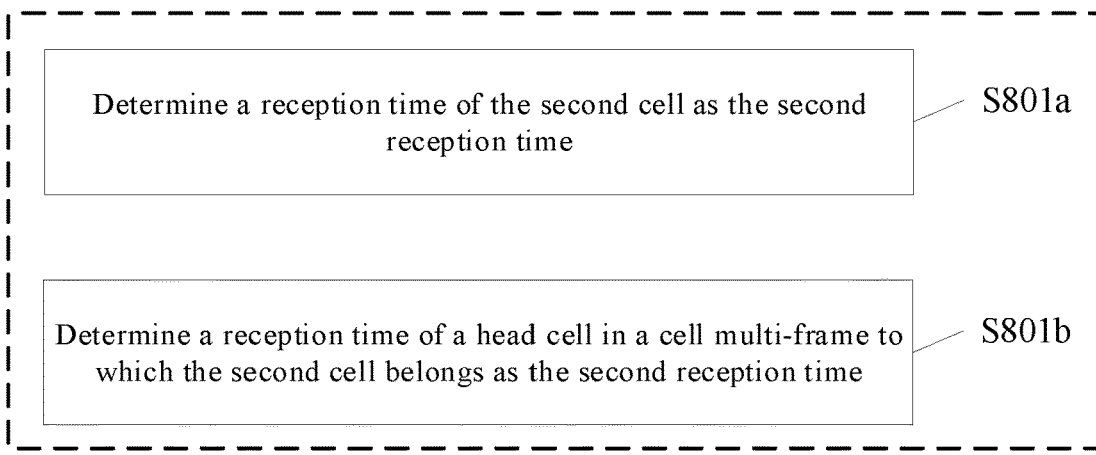
FIG. 7 is a flowchart of a method for implementing operation S8 according to the present disclosure.

FIG. 7 is a flowchart of a method for implementing operation S8 according to the present disclosure. Specifically, the second cell is a first one (i.e., head cell) of a plurality of second message cells corresponding to the delay request message. As shown in FIG. 7, in operation S8, determining the second reception time corresponding to the second cell includes: operation S801a.

At operation S801a, determining a reception time of the second cell as the second reception time.

In operation S801a, the reception time of the second cell (i.e., the time at which the second cell is received) is directly used as the second reception time, i.e., the reception time of the head cell of the plurality of second message cells corresponding to the delay request message is taken as the second reception time.

Alternatively, in operation S8, determining the second reception time corresponding to the second cell includes: operation S801b.

At operation S801b, determining a reception time of a head cell (may also be called a first cell) in a cell multi-frame to which the second cell belongs as the second reception time.

In operation S801b, the reception time of the head cell in the cell multi-frame to which the second cell belongs is taken as the second reception time, i.e., the reception time of the head cell of a first cell multi-frame corresponding to the delay request message is taken as the second reception time.

Figure 8:
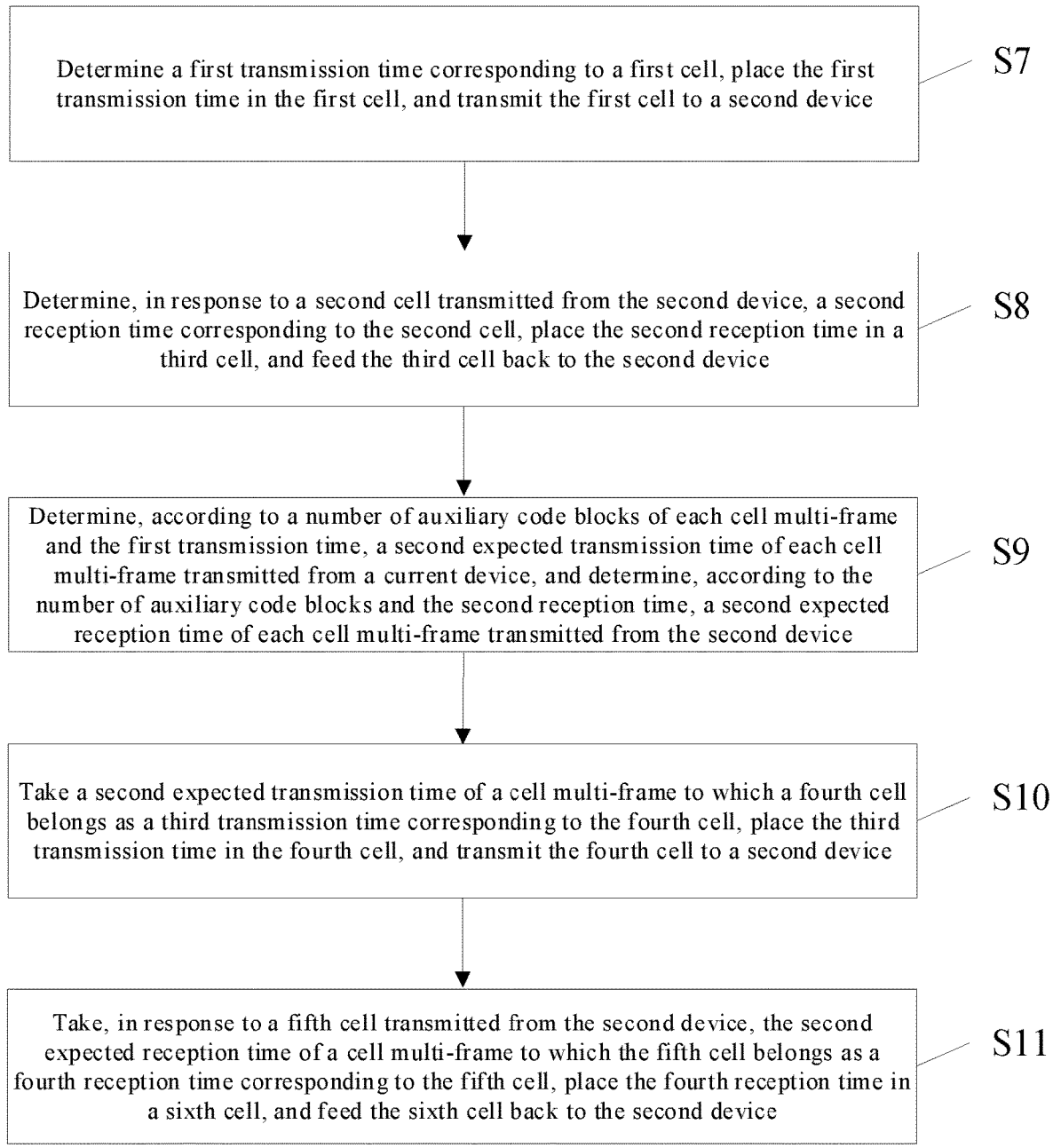
FIG. 8 is still another flowchart of a time calibration method according to the present disclosure.

FIG. 8 is still another flowchart of a time calibration method according to the present disclosure. As shown in FIG. 8, the time calibration method is a specific implementation based on the method shown in FIG. 5. Specifically, the first transmission time is determined from the transmission time of the head cell in the cell multi-frame to which the first cell belongs, and the second reception time is determined from the reception time of the head cell in the cell multi-frame to which the second cell belongs. In addition to operations S7 and S8, the time calibration method further includes: operations S9 to S11.

At operation S9, determining, according to a number of auxiliary code blocks of each cell multi-frame and the first transmission time, a second expected transmission time of each cell multi-frame transmitted from a current device, and determining, according to the number of auxiliary code blocks and the second reception time, a second expected reception time of each cell multi-frame transmitted from the second device.

In operation S9, a predicted time at which each cell multi-frame is transmitted from the current device is determined according to the number of auxiliary code blocks and the first transmission time, and a predicted time at which each cell multi-frame transmitted from the second device is received by the current device is determined according to the number of auxiliary code blocks and the second reception time. Therefore, the second expected reception (transmission) time of the cell multi-frame determined as above is the expected reception (transmission) time of the head cell in the cell multi-frame, and details about the calculation method may refer to the corresponding description in operation S3.

It should be noted that, in the present disclosure, the execution sequence of operations S7, S8, and S9 is not limited, and operation S9 may be performed after operation S8, or performed in alternation with operation S8.

After the operation S8 of feeding the third cell back to the second device, the time calibration method may further include operation S10.

At operation S10, taking the second expected transmission time of the cell multi-frame to which the fourth cell belongs as a third transmission time corresponding to the fourth cell, placing the third transmission time in the fourth cell, and transmitting the fourth cell to a second device.

Specifically, in a subsequent time calibration, the expected reception (transmission) time calculated may be used to directly derive the corresponding reception (transmission) time of the cell, and thus, no real-time detection process is desired.

At operation S11, taking, in response to a fifth cell transmitted from the second device, the second expected reception time of the cell multi-frame to which the fifth cell belongs as a fourth reception time corresponding to the fifth cell, placing the fourth reception time in a sixth cell, and feeding the sixth cell back to the second device.

In operation S11, the sixth cell is fed back to the second device so that the second device determines a second time offset value according to the third transmission time, a third reception time corresponding to the fourth cell, a fourth transmission time corresponding to the fifth cell, and the fourth reception time, and the time calibration is performed according to the second time offset value.

Figure 9:
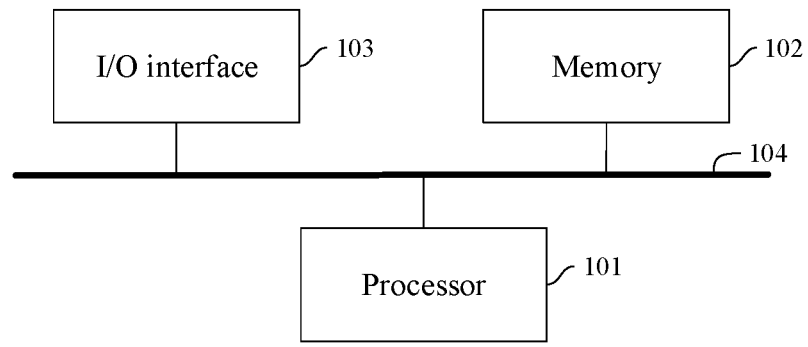
FIG. 9 is a schematic structural diagram of a communication device according to the present disclosure.

FIG. 9 is a schematic structural diagram of a communication device according to the present disclosure. As shown in FIG. 9, the communication device includes: at least one processor 101; a memory (storage means) 102 having at least one program stored thereon, the at least one program, executed by the at least one processor 101, causes the at least one processor 101 to perform the time calibration method including the operation S1 as described above; and at least one I/O interface 103 connected between the processor 101 and the memory 102, and configured to enable information interaction between the at least one processor 101 and the memory 102.

Each processor 101 is a device with a data processing capability, including but not limited to a central processing unit (CPU), or the like; the memory 102 is a device with a data storage capability including but not limited to, a random access memory (RAM, more specifically SDRAM, DDR, etc.), a read-only memory (ROM), an electrically erasable programmable read-only memory (EEPROM) or a flash memory (FLASH); and the at least one I/O interface (read/write interface) 103 is connected between the at least one processor 101 and the memory 102 to implement information interaction between the at least one processor 101 and the memory 102, and includes, but are not limited to, a bus or the like.

In some implementations, the at least one processor 101, the memory 102, and the at least one I/O interface 103 are interconnected via a bus 104, and further connected to other components of a computing device.

Figure 10:
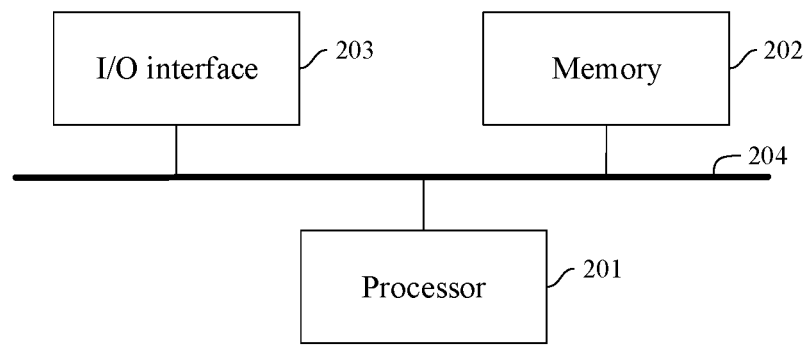
FIG. 10 is another schematic structural diagram of a communication device according to the present disclosure.

FIG. 10 is another schematic structural diagram of a communication device according to the present disclosure. As shown in FIG. 10, the communication device includes: at least one processor 201; a memory 202 having at least one program stored thereon, the at least one program, executed by the at least one processor 201, causes the at least one processor 201 to perform the time calibration method including the operation S7 as described above; and at least one I/O interface 203 connected between the processor 201 and the memory 202, and configured to enable information interaction between the at least one processor 201 and the memory 202.

Each processor 201 is a device with a data processing capability, including but not limited to a central processing unit (CPU), or the like; the memory 202 is a device with a data storage capability including but not limited to, a random access memory (RAM, more specifically SDRAM, DDR, etc.), a read-only memory (ROM), an electrically erasable programmable read-only memory (EEPROM) or a flash memory (FLASH); and the at least one I/O interface (read/write interface) 203 is connected between the at least one processor 201 and the memory 202 to implement information interaction between the at least one processor 201 and the memory 202, and includes, but are not limited to, buses or the like.

In some implementations, the at least one processor 201, the memory 202, and the at least one I/O interface 203 are interconnected via a bus 204, and further connected to other components of a computing device.

Figure 11:
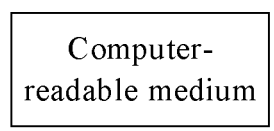
FIG. 11 is a schematic structural diagram of a computer-readable medium according to the present disclosure.

FIG. 11 is a schematic structural diagram of a computer-readable medium according to the present disclosure. The computer-readable medium has a computer program stored thereon, the computer program, when executed by a processor, causes the processor to perform operations of the time calibration method including the operation S1 as described above, and/or operations of the time calibration method including the operation S7 as described above.

Those of ordinary skill in the art will appreciate that all or some operations of the above described method, functional modules/units in the apparatus may be implemented as software, firmware, hardware, and suitable combinations thereof. In a hardware implementation, the division between the functional modules/units mentioned in the above description does not necessarily correspond to the division of physical components; for example, one physical component may have multiple functions, or one function or operation may be performed cooperatively by several physical components. Some or all physical components may be implemented as software executed by a processor, such as a CPU, a digital signal processor or microprocessor, or implemented as hardware, or implemented as an integrated circuit, such as an application specific integrated circuit. Such software may be distributed on a computer readable medium which may include a computer storage medium (or non-transitory medium) and a communication medium (or transitory medium). As is well known to those of ordinary skill in the art, the term computer storage medium includes volatile and nonvolatile, removable and non-removable medium implemented in any method or technology for storing information, such as computer-readable instructions, data structures, program modules or other data. A computer storage medium includes, but is not limited to, RAM, ROM, EEPROM, flash memory or other memory technology, CD-ROM, digital versatile disc (DVD) or other optical disc storage, magnetic cartridge, magnetic tape, magnetic disk storage or other magnetic storage devices, or may be any other medium used for storing the desired information and accessible by a computer. Moreover, it is well known to those ordinary skilled in the art that a communication medium typically includes a computer-readable instruction, a data structure, a program module, or other data in a modulated data signal, such as a carrier wave or other transport mechanism, and may include any information delivery medium.

The present disclosure has disclosed exemplary embodiments, and although specific terms are employed, they are used and should be interpreted merely in a generic and descriptive sense, not for purposes of limitation. In some instances, features, characteristics and/or elements described in connection with a particular embodiment may be used alone, or may be used in combination with features, characteristics and/or elements described in connection with other embodiments, unless expressly stated otherwise, as would be apparent to one skilled in the art. It will, therefore, be understood by those skilled in the art that various changes in form and details may be made therein without departing from the scope of the present disclosure as set forth in the appended claims.

What is claimed is:

1. A time calibration method, performed by a second device, comprising:
   determining, in response to a first cell transmitted from a first device, a first reception time corresponding to the first cell, and transmitting a second cell to the first device, the first cell carrying a first transmission time corresponding to the first cell; and
   receiving a third cell that is fed back by the first device and carries a second reception time corresponding to the second cell, determining a first time offset value according to the first transmission time, the first reception time, a second transmission time corresponding to the second cell, and the second reception time, and performing a time calibration according to the first time offset value,
   wherein the first cell is a head cell of a plurality of first message cells corresponding to one time synchronization message; the second cell is a head cell of a plurality of second message cells corresponding to one delay request message;
   determining the first reception time corresponding to the first cell comprises:
   determining a reception time of the first cell as the first reception time; or, determining a reception time of a head cell in a cell multi-frame to which the first cell belongs as the first reception time, and
   before determining the first time offset value according to the first transmission time, the first reception time, the second transmission time corresponding to the second cell, and the second reception time, and performing the time calibration according to the first time offset value, the time calibration method further comprises:
   determining a transmission time of the second cell as the second transmission time; or, determining a transmission time of a head cell in a cell multi-frame to which the second cell belongs as the second transmission time.

2. The time calibration method according to claim 1, wherein the first cell, the second cell, and the third cell carry at least part message data of precision time protocol messages corresponding to the first cell, the second cell, and the third cell, respectively; and the precision time protocol messages comprise the time synchronization message, the delay request message, and a delay response message.

3. The time calibration method according to claim 2, wherein each single precision time protocol message corresponds to a plurality of message cells, all message data of each single precision time protocol message are transmitted over a general communication channel in an overhead area of the message cells.

4. A communication device, comprising:
   at least one processor; and
   a storage means configured to store at least one program, the at least one program, executed by the at least one processor, causes the at least one processor to perform the time calibration method according to claim 3.

5. A communication device, comprising:
   at least one processor; and
   a storage means configured to store at least one program, the at least one program, executed by the at least one processor, causes the at least one processor to perform the time calibration method according to claim 2.

6. The time calibration method according to claim 1, wherein the first reception time is determined from the reception time of the head cell in the cell multi-frame to which the first cell belongs, and the second transmission time is determined from the transmission time of the head cell in the cell multi-frame to which the second cell belongs;
   the time calibration method further comprises:
   receiving a number of auxiliary code blocks of each cell multi-frame transmitted from the first device, determining, according to the number of auxiliary code blocks and the first reception time, a first expected reception time of each cell multi-frame transmitted from the first device, and determining, according to the number of auxiliary code blocks and the second transmission time, a first expected transmission time of each cell multi-frame transmitted from a current device;

after performing the time calibration according to the first time offset value, the time calibration method further comprises:

taking, in response to a fourth cell transmitted from the first device, the first expected reception time of a cell multi-frame to which the fourth cell belongs as a third reception time corresponding to the fourth cell, wherein the fourth cell carries a third transmission time corresponding to the fourth cell;

transmitting a fifth cell to the first device, and taking a first expected transmission time of a cell multi-frame to which the fifth cell belongs as a fourth transmission time corresponding to the fifth cell; and receiving a sixth cell that is fed back by the first device and carries a fourth reception time corresponding to the fifth cell, determining a second time offset value according to the third transmission time, the third reception time, the fourth transmission time, and the fourth reception time, and performing a time calibration according to the second time offset value.

7. A communication device, comprising:
at least one processor; and
a storage means configured to store at least one program, the at least one program, executed by the at least one processor, causes the at least one processor to perform the time calibration method according to claim 6.

8. A communication device, comprising:
at least one processor; and
a storage means configured to store at least one program, the at least one program, executed by the at least one processor, causes the at least one processor to perform the time calibration method according to claim 1.

9. A non-transitory computer-readable medium storing a computer program thereon, the computer program, executed by a processor, causes the processor to perform the time calibration method according to claim 1.

10. A time calibration method, performed by a first device, comprising:

determining a first transmission time corresponding to a first cell, placing the first transmission time in the first cell, and transmitting the first cell to a second device; and determining, in response to a second cell transmitted from the second device, a second reception time corresponding to the second cell, placing the second reception time in a third cell, and feeding the third cell back to the second device, so that the second device determines a first time offset value according to the first transmission time, a first reception time corresponding to the first cell, a second transmission time of the second cell, and the second reception time, and performs a time calibration according to the first time offset value, wherein the first cell is a head cell of a plurality of first message cells corresponding to one time synchronization message; the second cell is a head cell of a plurality of second message cells corresponding to one delay request message;

determining the first transmission time corresponding to the first cell comprises:
determining a transmission time of the first cell as the first transmission time; or, determining a transmission time of a head cell in a cell multi-frame to which the first cell belongs as the first transmission time, and determining the second reception time corresponding to the second cell comprises:
determining a reception time of the second cell as the second reception time; or, determining a reception time of a head cell in a cell multi-frame to which the second cell belongs as the second reception time.

11. The time calibration method according to claim 10, wherein the first cell, the second cell, and the third cell carry at least part message data of precision time protocol messages corresponding to the first cell, the second cell, and the third cell, respectively; and the precision time protocol messages comprise a time synchronization message, the delay request message, and a delay response message.

12. The time calibration method according to claim 11, wherein each single precision time protocol message corresponds to a plurality of message cells, all message data of each single precision time protocol message are transmitted over a general communication channel in an overhead area of the message cells.

13. A communication device, comprising:
at least one processors; and
a storage means configured to store at least one program, the at least one program, executed by the at least one processor, causes the at least one processor to perform the time calibration method according to claim 12.

14. A communication device, comprising:
at least one processors; and
a storage means configured to store at least one program, the at least one program, executed by the at least one processor, causes the at least one processor to perform the time calibration method according to claim 11.

15. The time calibration method according to claim 10, wherein the first transmission time is determined from the transmission time of the head cell in the cell multi-frame to which the first cell belongs; the second reception time is determined from the reception time of the head cell in the cell multi-frame to which the second cell belongs;

the time calibration method further comprises:
determining, according to a number of auxiliary code blocks of each cell multi-frame and the first transmission time, a second expected transmission time of each cell multi-frame transmitted from a current device;
determining, according to the number of auxiliary code blocks and the second reception time, a second expected reception time of each cell multi-frame transmitted from the second device; and after feeding the third cell back to the second device, the time calibration method further comprises:

taking a second expected transmission time of a cell multi-frame to which a fourth cell belongs as a third transmission time corresponding to the fourth cell, placing the third transmission time in the fourth cell, and transmitting the fourth cell to the second device; and taking, in response to a fifth cell transmitted from the second device, the second expected reception time of a cell multi-frame to which the fifth cell belongs as a fourth reception time corresponding to the fifth cell, placing the fourth reception time in a sixth cell, and feeding the sixth cell back to the second device, so that the second device determines a second time offset value according to the third transmission time, a third reception time corresponding to the fourth cell, a fourth transmission time corresponding to the fifth cell, and the fourth reception time, and performs the time calibration according to the second time offset value.

16. A communication device, comprising:
at least one processors; and
a storage means configured to store at least one program, the at least one program, executed by the at least one processor, causes the at least one processor to perform the time calibration method according to claim 6.

17. A non-transitory computer-readable medium storing a computer program thereon, the computer program, executed by a processor, causes the processor to perform the time calibration method according to claim 6.

* * * * *